United States Patent
Bradley et al.

(10) Patent No.: US 6,735,589 B2
(45) Date of Patent: May 11, 2004

(54) METHOD OF REDUCING DIMENSIONALITY OF A SET OF ATTRIBUTES USED TO CHARACTERIZE A SPARSE DATA SET

(75) Inventors: Paul S. Bradley, Seattle, WA (US); Demetrios Achlioptas, Seattle, WA (US); Christos Faloutsos, Pittsburgh, PA (US); Usama Fayyad, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 335 days.

(21) Appl. No.: 09/876,321

(22) Filed: Jun. 7, 2001

(65) Prior Publication Data
US 2003/0028541 A1 Feb. 6, 2003

(51) Int. Cl.$^7$ .............................. G06F 17/30; G06F 1/10
(52) U.S. Cl. ......................... 707/6; 707/100; 707/101; 707/102
(58) Field of Search .............................. 707/100, 101, 707/6, 102

(56) References Cited

U.S. PATENT DOCUMENTS

| | | | |
|---|---|---|---|
| 5,799,300 A | * 8/1998 | Agrawal et al. | 707/5 |
| 5,799,301 A | * 8/1998 | Castelli et al. | 707/6 |
| 5,946,692 A | * 8/1999 | Faloutsos et al. | 707/101 |
| 6,032,146 A | * 2/2000 | Chadha et al. | 707/6 |
| 6,260,038 B1 | * 7/2001 | Martin et al. | 707/7 |
| 6,314,419 B1 | * 11/2001 | Faisal | 707/2 |
| 6,486,881 B2 | * 11/2002 | Hunter et al. | 345/473 |
| 6,505,207 B1 | * 1/2003 | Aggarwal et al. | 707/101 |

OTHER PUBLICATIONS

T.H. Cormen, E.E. Leiserson and R.L. Rives *Introduction to Algorithms,* Chapter 31 entitled "Matrix Operations", MIT Press 1990. Pp. 730–775.

G.H. Golub and C.F. Van Loan, *Matrix Computation,* Third Edition. John Hopkins University Press, 1996. Pp. 70–75.

G. Strang, *Linear Algebra and Its Application,* Appendix A entitled "The Singular Value Decomposition and the Pseudoinvere", Harcourt Brace & Company, 1988. Pp. 442–452.

\* cited by examiner

*Primary Examiner*—Wayne Amsbury
*Assistant Examiner*—Cindy Nguyen
(74) *Attorney, Agent, or Firm*—Watts Hoffmann Co., L.P.A.

(57) ABSTRACT

A dimensionality reduction method of generating a reduced dimension matrix data set Dnew of dimension m×k from an original matrix data set D of dimension m×k wherein n>k. The method selects a subset of k columns from a set of n columns in the original data set D where the m rows correspond to observations Ri where i=1, ..., m and the n columns correspond to attributes Aj where j=1, ..., n and dij is the data value associated with observation Ri and attribute Aj. The data values in the reduced data set Dnew for each of the selected k attributes is identical to the data values of the corresponding attributes in the original data set. The steps of the method include: for each of the attributes Aj in the original data set D, calculating a value of variance of the data values associated with attribute Aj, where the variance value, Var(Aj), of the attribute Aj is calculated as follows:

$$\mathrm{Var}(Aj) = [1/m] * \sum_{i=1}^{m} (dij - \mathrm{Mean}(Aj))^2,$$

where Mean(Aj) is the mean value of the data values corresponding to attribute Aj; selecting the k attributes having the greatest variance values; and generating the reduced data set Dnew by selecting data values in the original data set D corresponding to the selected k attributes.

44 Claims, 6 Drawing Sheets

Fig.1

REDUCED DATA SET D$_{NEW}$
ATTRIBUTES

| | $A_1'$ | $A_2'$ | $A_3'$ | ... | $A_j'$ | ... | $A_k'$ |
|---|---|---|---|---|---|---|---|
| $R_1$ | $d_{11}'$ | $d_{12}'$ | $d_{13}'$ | ... | $d_{1j}'$ | ... | $d_{1k}'$ |
| $R_2$ | $d_{21}'$ | $d_{22}'$ | $d_{23}'$ | ... | $d_{2j}'$ | ... | $d_{2k}'$ |
| $R_3$ | $d_{31}'$ | $d_{32}'$ | $d_{33}'$ | ... | $d_{3j}'$ | ... | $d_{3k}'$ |
| ⋮ | ⋮ | ⋮ | ⋮ | ... | ⋮ | ... | ⋮ |
| $R_i$ | $d_{i1}'$ | $d_{i2}'$ | $d_{i3}'$ | ... | $d_{ij}'$ | ... | $d_{ik}'$ |
| ⋮ | ⋮ | ⋮ | ⋮ | ... | ⋮ | ... | ⋮ |
| $R_m$ | $d_{m1}'$ | $d_{m2}'$ | $d_{m3}'$ | ... | $d_{mj}'$ | ... | $d_{mk}'$ |

OBSERVATIONS

METHOD OF REDUCING DIMENSIONALITY OF A SET OF ATTRIBUTES USED TO CHARACTERIZE A SPARSE DATA SET

FIELD OF THE INVENTION

This invention relates generally to a method of reducing dimensionality of a set of attributes used to characterize a sparse data set and, more particularly, a method of reducing dimensionality of a set of attributes based on the calculated variance of the data values associated with each of the attributes.

BACKGROUND ART

Data mining identifies and extracts relevant data in a computer accessed database. In certain applications, a data set in a database may be in tabular or matrix format wherein the rows of the matrix represent individual observations and the columns of the matrix represent various attributes of the data. The cells of the matrix contain data values. Each observation or row of the matrix contains a data value for each of the attributes, that is, if a matrix data set has m observations (rows) and n attributes (columns), there will be m×n data values. In many applications, the number of non-trivial (that is, non zero) values per observation is much smaller than n. An example of this phenomenon occurs when attributes represent products sold in a supermarket while observations represent individual customer's market baskets. Most customers purchase a very small fraction of all available products during a shopping trip, so the vast majority of entries in each row is zero. This condition is commonly referred to as the matrix being "sparse." When this condition of a sparse matrix does not hold, the matrix is commonly referred to as being "dense."

It is often advantageous to obtain a reduced set of k attributes to characterize data in the matrix where k<n. This will be referred to as reducing the dimensionality of the matrix data set. One technique that has been used to reduce the number of attributes characterizing a matrix data set is referred to as singular value decomposition (SVD). The SVD method generates a set of k equations (describing the new attributes) with each new attribute being a linear combination of the original n attributes. Disadvantages of the SVD method include:

1) computational complexity—the SVD method requires computation time, CT, on the order of CT=A*Q*k*log (n), where A is a constant, Q is the number of nonzero entries in a data matrix, k is number of attributes in the reduced set of attributes and n is the number of attributes in the original set of attributes;
2) results in a dense matrix—because each new attribute is a linear combination of the original attributes, the SVD method results in a matrix of data values that is dense; and
3) resulting data is nonintuitive—the results of applying the SVD method do not have an intuitive interpretation since each of the resulting k attributes is a linear combination of the original attributes. Thus, while originally each attribute corresponded to, for example, a particular product, a new attribute might be something like
"2.0*white bread−0.3*cheddar cheese+0.7*peanuts". It is generally very difficult to extract the "meaning" of such an attribute.

Values of an attribute may be continuous (e.g., age, height, or weight of a respondent) or discrete (e.g., sex, race, year). Discrete attributes, that is, attributes having data values that are discrete variables, have a finite number of data values. Certain discrete attributes have only two data values (0 and 1) associated with the attribute, i.e., sex—male or female, where male=0 and female=1. Such discrete attributes will be referred to as dichotomous discrete attributes.

While the SVD method has several disadvantages, its major advantage is that it is a very effective methodology with regard to maintaining the distance structure between observations. Essentially, if the attribute data values associated with each observation are viewed as an n dimensional vector, the distance between two observations may be calculated as follows:

Define:

Observation no. 1: let the first data row, R1=[d11, d12, d13, d14, d15, . . . , d1n] where d11 is the data value for observation no. 1 and attribute no. 1, d12 is the data value for observation no. 1 and attribute no. 2, . . . , and d1n is the data value for observation no. 1 and attribute no. n.

Observation no. 2: let the second data row, R2=[d21, d22, d23, d24, d25, . . . , d2n] where d21 is the data value for observation no. 2 and attribute no. 1, d22 is the data value for observation no. 2 and attribute no. 2, . . . , and d2n is the data value for observation no. 2 and attribute no. n.

Calculate distance value (DIST 1–2) between the pair of observations nos. 1 and 2 as follows:

$$\text{DIST } 1\text{–}2 = [(d11-d21)^2 + (d12-d22)^2 + (d13-d23)^2 + (d14-d24)^2 + \ldots + (d1n-d2n)^2]^{1/2}$$

Assuming similar distance values are determined for each of the m*(m−1)/2 pairs of the m observations, the SVD method has been found to be "robust" in maintaining the distance structure between all pairs of observations while reducing the dimension of the attributes characterizing the data set from n attributes to k attributes. The SVD method is "robust" in maintain the distance structure between the data points in the following sense. Let the distortion of a data point (a row) be equal to the square of the difference between its original distance from the origin and its distance from the origin after dimensionality reduction. Then, among all possible dimensionality reductions to k dimensions from the n original dimensions, the SVD method minimizes the sum of the distortion over all points.

SUMMARY OF THE INVENTION

The present invention provides a dimensionality reduction method useful in sparse data sets that is effective and efficient when implemented in software for use in connection with data mining of a database management system. The dimensionality reduction method for use in a sparse database substantially preserves the distance structure between observations. Sparse data matrices are predominant in most real world data mining applications.

The attribute reduction method of the present invention may be used for both continuous and discrete attribute data and is best suited for matrix data sets that are sparse, that is, data sets that have a high proportion of zero values. Many real world marketing-related databases have a large number of discrete attributes that have dichotomous or two state data values most of which have zero values. For example, assume that a company sells a large variety of products and the company has established a matrix in its database to track customer purchases. If the rows of a matrix represent customers of a company and the attributes of the matrix correspond to whether or not a customer has purchased each of the products sold by the company with cell having a value of 1 if customer i has purchased product j and having a value of 0 if customer i has not purchased product j. In a matrix such as this, it could easily be the case that 90% or more of the cell data values or cell entries have a value of zero.

It is an object of this invention to provide a method of efficiently reducing the number of attributes that characterize set of data values in a data matrix D where the data matrix is sparse, that is, has a high proportion of zero values. The data matrix D is defined by an m×n matrix wherein the m rows of the matrix represent individual observations, e.g., a customer, an event or occurrence, a location, etc., and the n columns represent attributes of the observations. The cells of the matrix D contain specific data values for the associated observation and attribute. A reduced dimension matrix, Dnew, including m observations and k attributes (k<n) is desired. It is assumed that the magnitude of the value of k is set by a user or is arbitrarily set based on the number of attributes in the full scale matrix D.

One aspect of the present invention is a dimensionality reduction method of selecting k attributes from a set of n attributes to characterize data values in a data matrix D having m observations. The value of the data matrix entry in row i and column j is denoted as dij. The steps of the method include the following:

a) for each of the attributes Aj (j=1 ..., n), calculate the variance of the attribute, where the variance of attribute Aj is calculated as follows:

$$\text{Var}(Aj) = [1/m] * \sum_{i=1}^{m} (dij - \text{Mean}(Aj))^2$$

$$\text{where Mean } (Aj) = [1/m] * \sum_{i=1}^{m} d_{ij};$$

b) select the k attributes having the greatest variance values; and c) generate a m×k data matrix Dnew by selecting those data values corresponding to the m observations and the selected k attributes.

In the dimensionality reduction method of the present invention, the reduced set of k attributes accurately characterize the data of the original matrix D. By "accurately characterize the data" it is meant that the selected k attributes are attributes in the original matrix D that can be best used to effectively differentiate between observations and are useful, for example, in making predictions about an observation based on the data values of the k attributes for the observation. For example, an attribute that has the same data values for each of the observations cannot be used to differentiate between the observations and would not be useful in making predictions about an observation. By "accurately characterize the data" it is also meant that the distance structure between pairs of observations will be maintained to the extent possible between the original matrix D and the reduced dimension matrix Dnew. The fact that the reduced set of k attributes selected by the dimensionality reduction method of the present invention "accurately characterize the data" is borne out by favorable experimental results. Moreover, for the case where the covariance matrix is diagonal, one can prove that the method of the present invention produces the exact same results as the SVD method.

When operated on a sparse data set (90% or more zero entries), the dimensionality reduction method of the present invention generally preserves the distance structure between the observations while requiring a computation time, CT, on the order of CT=B*Q, where B is some constant value and Q is the total number of nonzero entries in the matrix D. In comparison the SVD method generally requires a computation time, CT, on the order of CT=A*Q*k*log(n), where A is a constant, Q is the number of nonzero entries in a data matrix, k is the number of attributes in the reduced set of attributes and n is the number of attributes in the original set of attributes. As can be seen from the respective CT equations, the sparser the data the faster both methods are run on a computer. However, the dimensionality reduction method of the present invention is computationally faster than the SVD method by a factor of k*log(n) and, additionally, the method of the present invention is also faster because empirically it has been found that A is a much smaller constant than B. Over a sparse data set, the dimensionality reduction method of the present invention preserves the favorable distance structure property of the SVD method while the reducing computational time required compared with the SVD method. Moreover, if an explicit reconstruction of the points in the reduced dimensionality space is needed, then SVD requires an extra reconstruction step. The extra reconstruction step takes time RT=C*m*k, where C is a constant, m is the number of observations and k is the number of attributes in the reduced set of attributes. The dimensionality reduction method of the present invention, on the other hand, requires no reconstruction time since the representation in the reduced dimensionality space is merely the result of ignoring certain n−k of the original attributes.

Moreover, in the method of the present invention, the k attributes of the new data matrix Dnew are simply a subset of the n attributes of the original data matrix D. Since the original data set D is sparse, so to is the new data matrix Dnew. The SVD method does not have this desirable property. Thus, while both the method of the present invention and the SVD method output an m×k new data matrix, the method of the present invention outputs a sparse new data matrix while the SVD method outputs a dense new data matrix. Stated another way, key to the dimensionality reduction method of the present invention is the fact that the selected k attributes are a subset of the original n attributes and generation of the new reduced dimension matrix Dnew only involves picking those data values from the original matrix D that correspond to the selected k attributes. This is in contrast to the SVD method wherein each data value of the reduced dimension matrix must be calculated as a linear combination of each of the original attribute data values. The ease of computation, the intuitive nature of the data values selected for inclusion in the Dnew matrix, and the maintenance of the sparseness of the original D matrix of the method of the present invention versus the SVD method are important advantages of the present invention.

These and other objects, advantages, and features of the present invention are described in detail in conjunction with the accompanying drawings.

BRIEF DESCRIPTION OF THE DRAWINGS

FIG. 4 is a flow chart of a substep of a step of the preferred embodiment of FIG. 3 and, specifically, FIG. 4 is a flow chart of a GetKGreatest function which would be called by a computer program performing the dimensionality reduction method illustrated in the flow chart of FIGS. 3A and 3B.

DETAILED DESCRIPTION OF THE INVENTION

Figure 1:
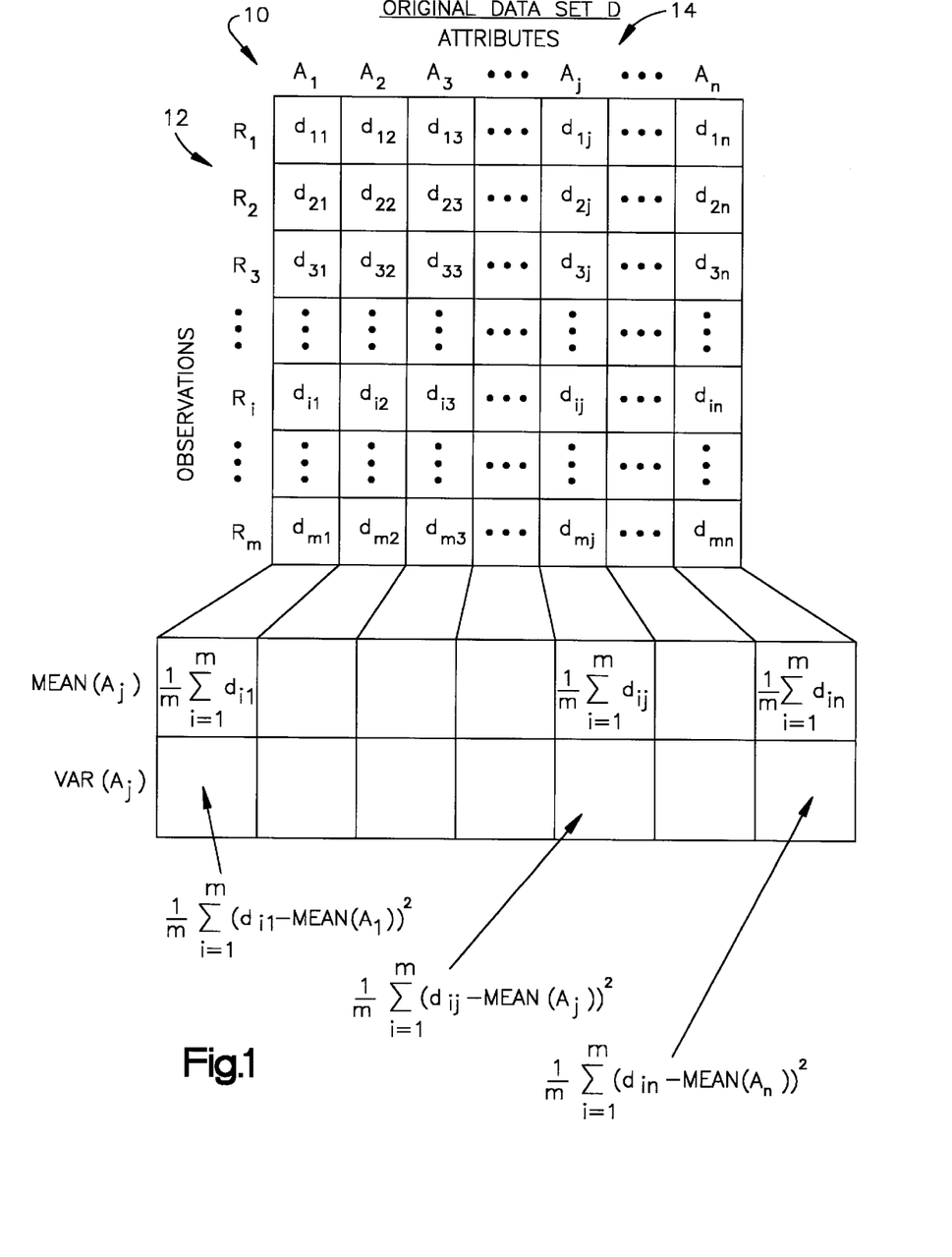
FIG. 1 is a representation of a data set comprising a matrix of data values.

Turning to FIG. 1, a representation of an original matrix data set D is shown generally at 10. The matrix data set D 10 includes m rows 12 and n columns 14. Each of the rows 12 corresponds to a specific observation (e.g., a customer or an event) and each of the columns 14 corresponds to a specific attribute (e.g., sex of customer, family income of customer). The individual cells of the matrix 10 contain the individual data values, d, for the corresponding observation and attribute. For example, if the rows 12 represent customers and the columns 14 represent customer attributes, the data value dij for the cell labeled Ri, Aj represents the specific data value for customer i for attribute j.

The dimensionality reduction method of the present invention, shown generally at 100 in FIG. 3, involves reducing the attribute or column dimensionality of the matrix D, that is, reducing the number of attributes used to characterize the observations data values from n attributes to a reduced set of attributes k, where k<n. The dimensionality reduction method 100 works best on sparse data matrices, that is, data matrices that have a substantial proportion of the data values D with value zero, typically, sparse data refers to 90% or more of the data values of a matrix being equal to zero.

The dimensionality reduction method 100 can, however, be used advantageously on any matrix. It has been observed that in many web-browsing and e-commerce data analysis tasks are characterized by sparse data matrices. Additionally, while the method 100 is applicable to data values that are both continuous and discrete, it is most advantageously applied to discrete attributes that are either dichotomous (0/1 are the only data values) or that are logically numerically "orderable," that is, where a numerical ordering of data values has some real world meaning. For example, age is a discrete variable that is "orderable" numerically. It makes sense to say that someone who is 10 years old is "closer" to someone who is 20 years old than someone who is 80 years old. Thus, combining the 10 year old and the 20 year old into a single "category" for data ananlysis purposes has an underlying logic based on commonality of age. A discrete variable that would not be numerically "orderable" is automobile manufacturer. For example, if a General Motors automobile is mapped or assigned a value of 1, a Ford automobile is assigned a value of 2 and a Chrysler automobile is assigned a value of 3, it makes no sense to say that a GM automobile (1) is "closer" to a Ford automobile (2) than to a Chrysler (3).

Sparse data sets found in e-commerce and web-browsing applications are typically associated with discrete attribute data values and, more particularly, with discrete attribute values that are dichotomous, that is, attributes wherein the attribute data values have only two states or values, namely, 0 and 1 corresponding to "no" and "yes" or "male" and "female," "go" and "no go," etc.

Figure 2:
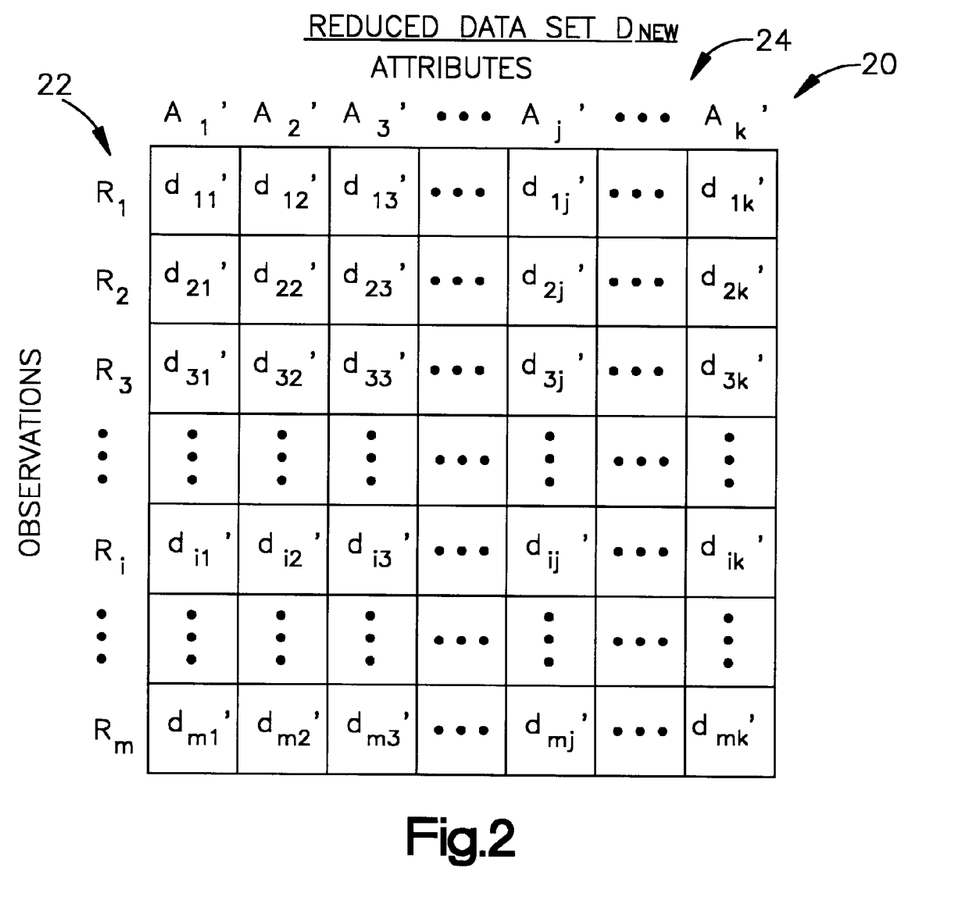
FIG. 2 is a block diagram of a dimensionality reduction method of the present invention of selecting a subset of k attribute from a set of n attributes to characterize a matrix data set.

In essence, the dimensionality reduction method 100 involves generating a reduced dimension data matrix, Dnew, shown representatively at 20 in FIG. 2, having m rows 22 by k columns 24 by selecting a subset of k attributes from the set of n attributes in the original matrix D 10 wherein the data values dij' in the reduced data set matrix Dnew 20 for each of the selected k attributes is identical to the data values d of the corresponding attributes (columns) in the original data set matrix D 10.

The steps of the dimensionality reduction method 100 comprise:

a) providing an original matrix data set D having dimension m rows by n columns wherein the m rows correspond to observations Ri, i=1 . . . , m and the n columns correspond to attributes Aj, j=1, . . . n and the data values of the matrix D are designated as dij;

b) for each of the attributes Aj of the original matrix D, calculating the variance of each of the attributes Aj, where the variance, Var(Aj), of the attribute Aj is calculated as follows:

$$Var(Aj) = [1/m] * \sum_{i=1}^{m} (dij - Mean(Aj))^2,$$

where dij is the data value associated with observation Ri and attribute Aj and where $$Mean\ (Aj) = [1/m] * \sum_{i=1}^{m} d_{ij};$$

c) selecting the k attributes having the greatest value of variance, Var(Aj); and d) generating the reduced data set Dnew having dimension m rows by k columns by selecting columns of data values in the original matrix D set corresponding to the selected k attributes Aj.

Prior to implementing the method 100, the data values of any attribute, that is, a continuous variables, that is, any attribute who data values are continuous (e.g., age, weight, income, etc.) must be normalized. Normalization of an attribute's data values is accomplished by dividing each of the m data values by the mean of those m data values $$\left(i.e., Mean\ (Aj) = [1/m] * \sum_{i=1}^{m} d_{ij}\right).$$

Further, it is assumed that prior to implementing the method 100, and that the data values of any multi-valued discrete attributes have been converted to dichotomous (0,1) attributes (e.g., for a variable such as "sex of respondent," a response of "male" is assigned a value of zero and a response of "female" is assigned a value of one).

The method 100 is best suited for dimensionality reduction wherein:

1) the data values of the matrix D are sparse (90% or more zeroes); and 2) a plot of the normalized variance of the data values associated with each attribute has a rapid decay pattern, that is, the method 100 will work best when, of the n attributes of the original matrix D, the number of attributes have relatively high variances is k or less and the remaining attributes have relatively low variances. Stated another way, the data values associated with the selected k attributes ideally should account for a very high proportion of the grand total of variance associated with all n attributes of the original matrix D.

A discussion of properties of covariance matrices may be found in *Pattern Classification and Scene Analysis*, by R. O. Duda and P. E. Hart, published by John Wiley & Sons, New York, 1973. The foregoing is incorporated in its entirety herein by reference.

Figure 3A:
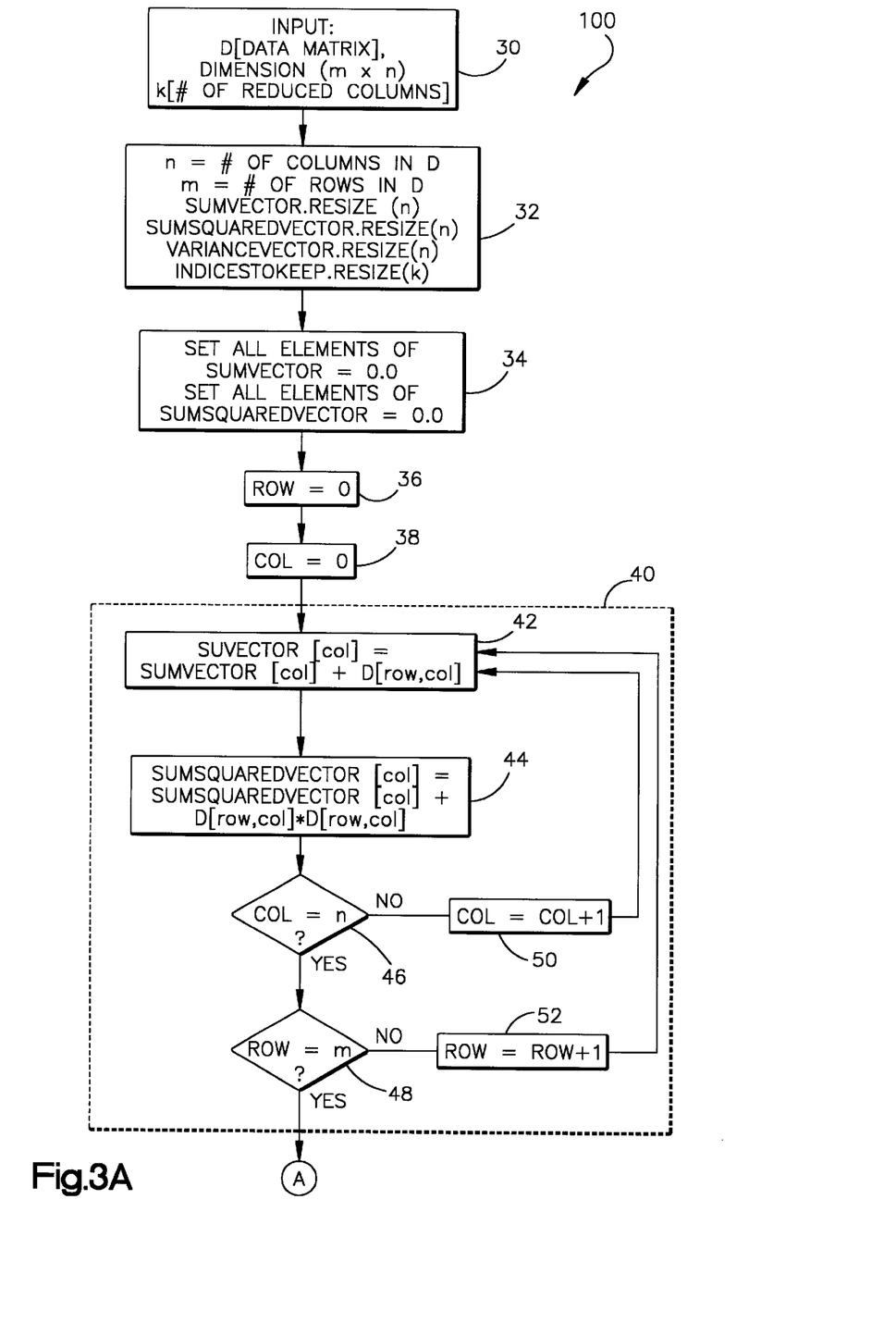
FIG. 3A is a portion of a flow chart of the preferred embodiment of the dimensionality reduction method of the present invention.
Figure 3B:
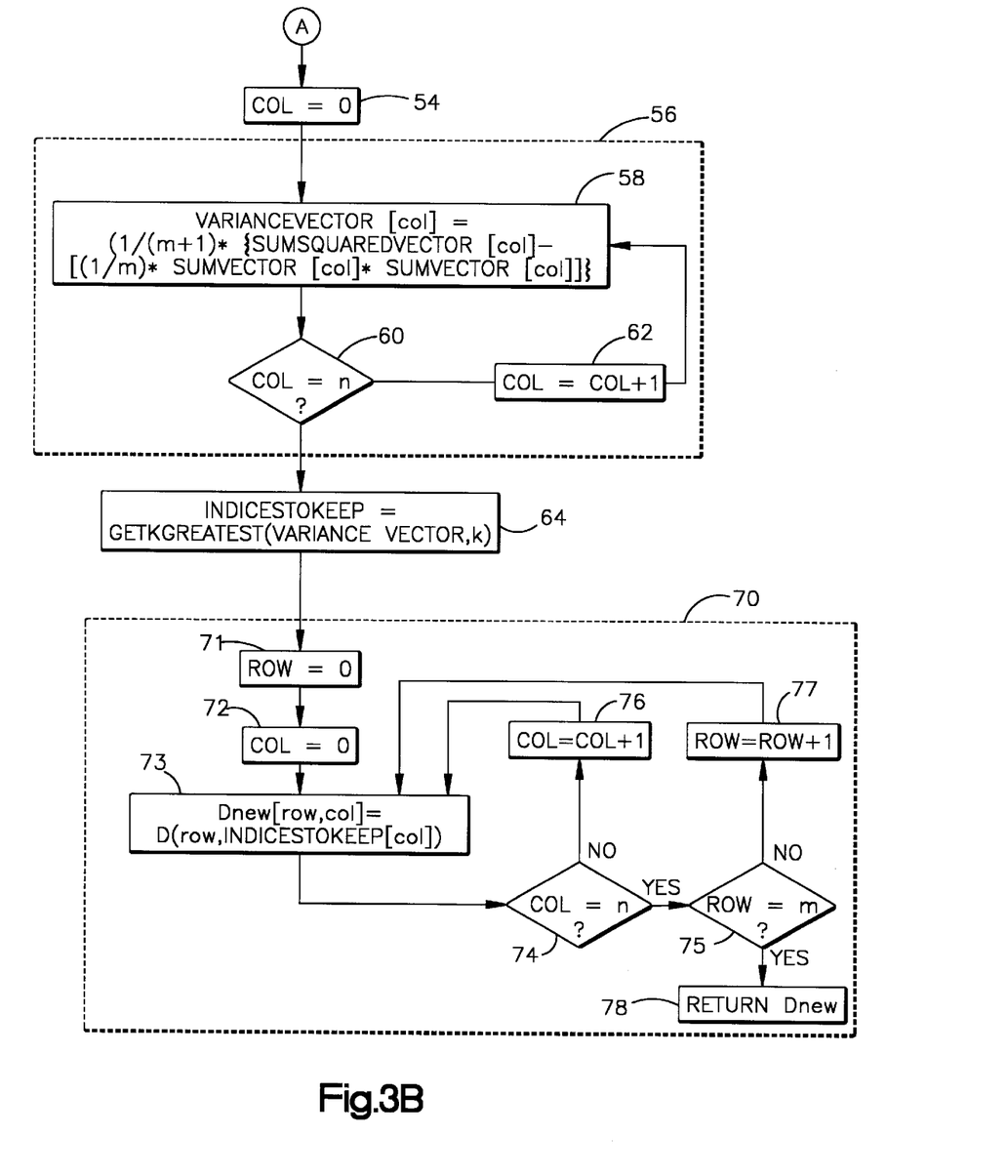
FIG. 3B is a matching portion of the flow chart of FIG. 3A.

A flow chart showing a preferred embodiment of the method 100 is shown in FIGS. 3A and 3B. Of course, it will be recognized by one skilled in the art that other embodiments, e.g., processing steps could be used to implement the method 100 of the present invention and it is the intent of the inventors to encompasses all such embodiments within the scope of this invention. It should also be recognized that operationally, the method 100 may advantageously be implemented in any number of programming languages in software as part of a database management system data mining software package.

At step 30 (FIG. 3A) of the flow chart, the method 100 requires input or selection of data values for a data matrix D of dimension m rows by n columns and a value for k which is the dimension of the number of columns in a reduced dimension data matrix Dnew to be generated. At step 32 of the method 100, n is defined as the number of columns and m is defined as the number of rows of data in the data matrix D. The following four vectors are defined to store calculated values: SumVector, SumSquaredVector, VarianceVector and IndicesToKeep. The notation "resize(n)" and "resize(k)" in FIG. 3A merely indicates that the vectors have been resized to have length n or k as the case may be. The IndicesToKeep vector will list the columns (attributes) of original matrix D that will be selected for inclusion in the new matrix Dnew.

At flow chart step 34 of the method 100, the elements of vectors SumVector and SumSquaredVector are initialized to a value of zero. At steps 36 and 38, ROW and COL count initial values are set to zero. In the steps 42, 44, 46, 48, 50, 52 of the method 100 enclosed within the dashed line 40, an iterative looping procedure is used to calculate a SumVector value for each column i where i=1, . . . , n and a SumSquaredVector value for each column i where i=1, . . . , n of the matrix D. Essentially, the SumVector for a column of the matrix D is the arithmetic sum of the data values d of the column. Similarly, the SumSquaredVector value for a column of the matrix D is the arithmetic sum of the square of the data values d of the column.

At flow chart step 54 of the method 100, after the SumVector and SumSquaredVector have been calculated for each of the n columns, the COL count value is reset to 0. In the steps 58, 60, 62 of the method enclosed within the dashed line 56, a VarianceVector value is calculated for each of the n columns. The equation used to calculate the variance of a column is as follows:

VarianceVector[col]=(1/(m−1))*{SumSquaredVector[col]−[(1/m)*SumVector[col]*SumVector[col]]} where $SumSquareVector[col] = \sum_{i=1}^{m} [(dij)^2]$ for the column and $$SumVector[col] = \sum_{i=1}^{m} dij$$

for the column.

The above equation is mathematically equivalent to the equation for variance set forth above:

$$Var(Aj) = [1/m] * \sum_{i=1}^{m} (dij - \text{Mean}(Aj))^2.$$

Figure 4:
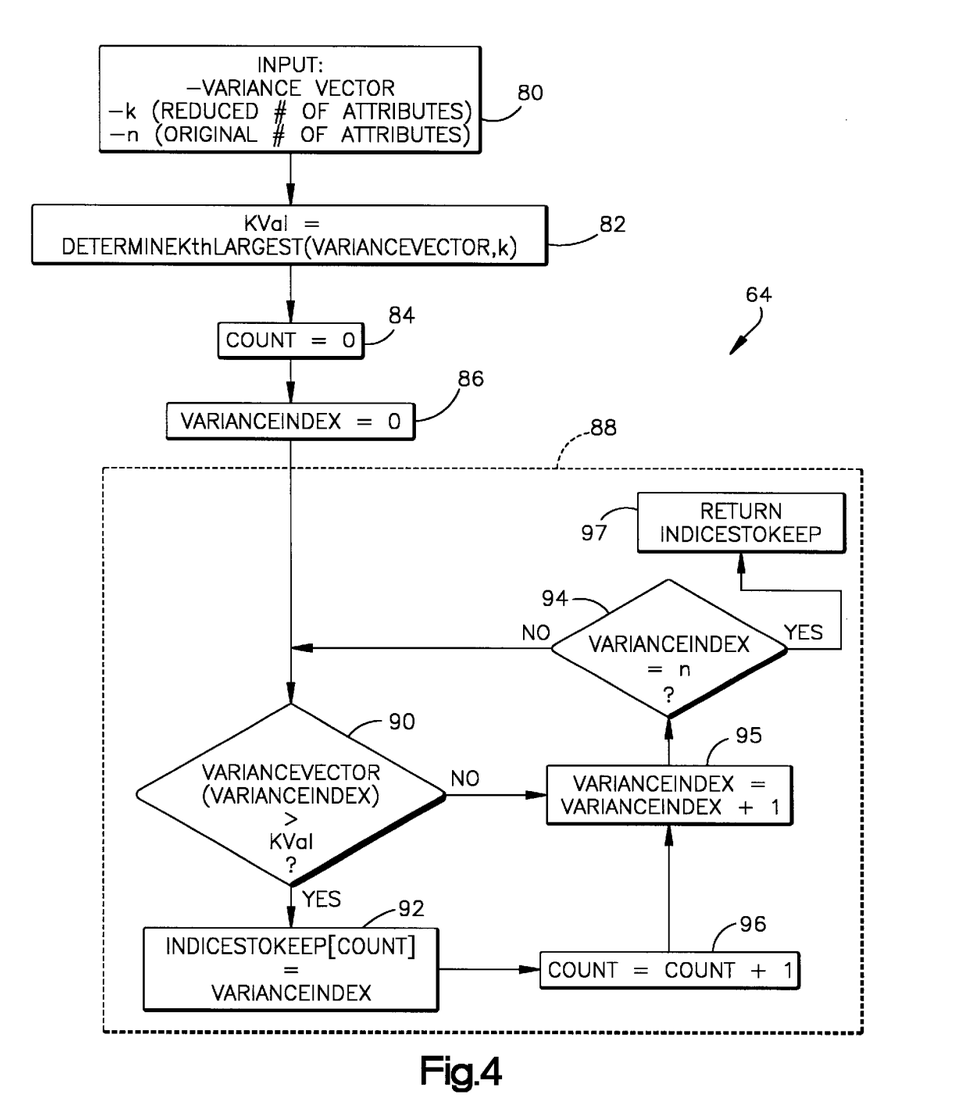

As shown in FIG. 3B, at flow chart step 64, a function or subroutine called GetKGreatest(VarianceVector,k) is used to identify the k columns of the matrix D with the greatest variance values. The identified k columns are saved in the IndicesToKeep vector. FIG. 4 is a flow chart of the GetKGreatest function, which will be explained below.

Finally, in flow chart steps 71, 72, 73, 74, 75, 76, 77, 78, (also shown in FIG. 3B) the matrix Dnew is generated using a looping procedure. In step 64, having identified the k columns of the matrix D that have the greatest variance values, the data associated with the k columns are selected in the looping process shown at steps 73, 74, 76, 75, 77. Essentially, the one pass through the matrix D is made, and the data associated with the identified k columns (stored in IndicesToKeep vector) having the greatest variance values is selected for inclusion into matrix Dnew. Matrix Dnew is then returned in step 78.

In steps 71 and 72, the ROW and COL counters are initialized to 0. In steps 73, 74, 75, 76, 77, first, each column of the matrix D is examined to see if the column under consideration is one of the identified k columns stored in the IndicesToKeep vector. If a column, for example, column 2, is one of the identified k columns stored in the IndicesToKeep vector, then, the loop shown in steps 75, 77, and 73 causes the data values of matrix D associated with column 2 are input row by row into matrix Dnew until the data values of all m rows of column have been input into matrix Dnew. Then, when ROW=m is satisfied (all m rows of the data values associated with column 2 have been entered into Dnew), then the next column (column 3) is examined to see if column 3 is one of the k columns identified in the IndicesToKeep vector. If so, then the data values associated with column 3 are input into matrix Dnew as described above. If not, then the next column (column 4) is examined and so on.

After all n columns have been examined, the matrix Dnew has been generated as an m×k matrix having the data values selected from the k columns of the original matrix D exhibiting the greatest variance values. Note that the data values in the reduced data set Dnew for each of the selected k attributes is identical to the data values of the corresponding attributes in the original data set. That is, if col 2 of the original matrix D is selected for inclusion into the reduced dimension matrix Dnew, the data values associated with col. 2 of D are copied directly into one of the k columns of Dnew. (e.g., column 1 of Dnew will identical to column 2 of D if column 1 of D was not selected identified for inclusion into Dnew). Assuming this is true, in FIG. 2, for example, the attribute labeled A1' in matrix Dnew would correspond to the attribute labeled A2 in matrix D, shown in FIG. 1, and the associated data values of A1" in matrix Dnew labeled d11', d21', d31', . . . , di1', . . . , dm1' in FIG. 2 would correspond to the data values of A2 in matrix D labeled d12, d22, d32, . . . , di2, . . . , dm2 in FIG. 1.

This identicality of data values is an advantage of the present method 100 because the attributes and associate data values selected by the method 100 have real world meaning to a user examining the matrix Dnew. That is, using the method 100, the attributes selected for inclusion in Dnew are a subset of the set of original attributes. In comparison, the SVD method, which provides a set of new attributes that are linear combinations of the original attributes, has no easily interpretable meaning in terms of the original attributes. Additionally, with the present method 100, the resulting matrix database Dnew remains sparse, that is, having many zero values if the original data set D was sparse. By contrast, the SVD method results in a dense (predominantly nonzero values) Dnew data set.

FIG. 4 illustrates a preferred embodiment of the Get-KGreatest function shown generally at 64. As can be seen in step 80, the inputs to the GetKGreatest function are the VarianceVector vector and the dimensions of n and k, n being the original number of columns or attributes and k being the desired reduced number of columns or attributes. At step 82, the GetKGreatest function utilizes a function called DetermineKthLargest which determines the value of the kth largest variance value of the VarianceVector vector. The kth largest variance value serves as a threshold value in determining what attributes are included in Dnew.

The DetermineKthGreatest function is a compare and select routine of a type well know to those skilled in the art of C++ programming. The value of the kth largest variance as determined by the DetermineKthLargest function is compared against each of the variance values of the VarianceVector and those attributes having variance values that are greater than the value of the kth largest variance are selected for inclusion in the matrix Dnew.

At step 82, a variable called KVal is defined to store the threshold variance value, that is, the kth largest variance value. At steps 84, 86, two counters, COUNT and VARIANCEINDEX are initialized to zero.

In flow chart steps 90, 92, 94, 95, 96, 97, which are enclosed within the dashed line 88, is an iterative loop procedure for selecting those columns (attributes) having variance values greater than or equal to the threshold variance value, KVal. As shown in step 64 of FIG. 3B, the selected attributes are returned to the main program through the vector denoted as IndicesToKeep. Returning to the GetKGreatest function, at step 90, for each of the n columns, the column variance value, VarianceVector, is compared to the threshold variance value, KVal. If the attribute variance value, VarianceVector, is greater than or equal to the threshold variance value, KVal, then at step 92, the column is included in the IndicesToKeep vector, the COUNT counter is incremented by one at step 96 and the VarianceIndex is incremented at step 95. If the attribute variance value, VarianceVector, is less than the threshold variance value, KVal, the VARIANCEINDEX counter is incremented by one but the COUNT counter is not incremented. Incrementing the VARIANCEINDEX counter causes the variance value of the next column (attribute) to be examined in step 90 as explained above. When the VARIANCEINDEX count reaches n, the number of columns in the original matrix D, the GetKGreatest function is completed and k attributes or columns of D having the greatest variance values have been identified and returned to the main program via the IndicesToKeep vector.

As explained above, at step 70 of the flow chart (FIG. 3B), the reduced dimension matrix Dnew is generated by using those columns (attributes) selected in the GetKGreatest function and saved in the IndicesToKeep vector. In steps 71–78, the Dnew matrix is generated by copying each row of the data values of the original matrix data set D into the reduced dimension matrix data set Dnew, but only for the k columns identified in the IndicesToKeep vector as explained above.

Computer System

Figure 5:
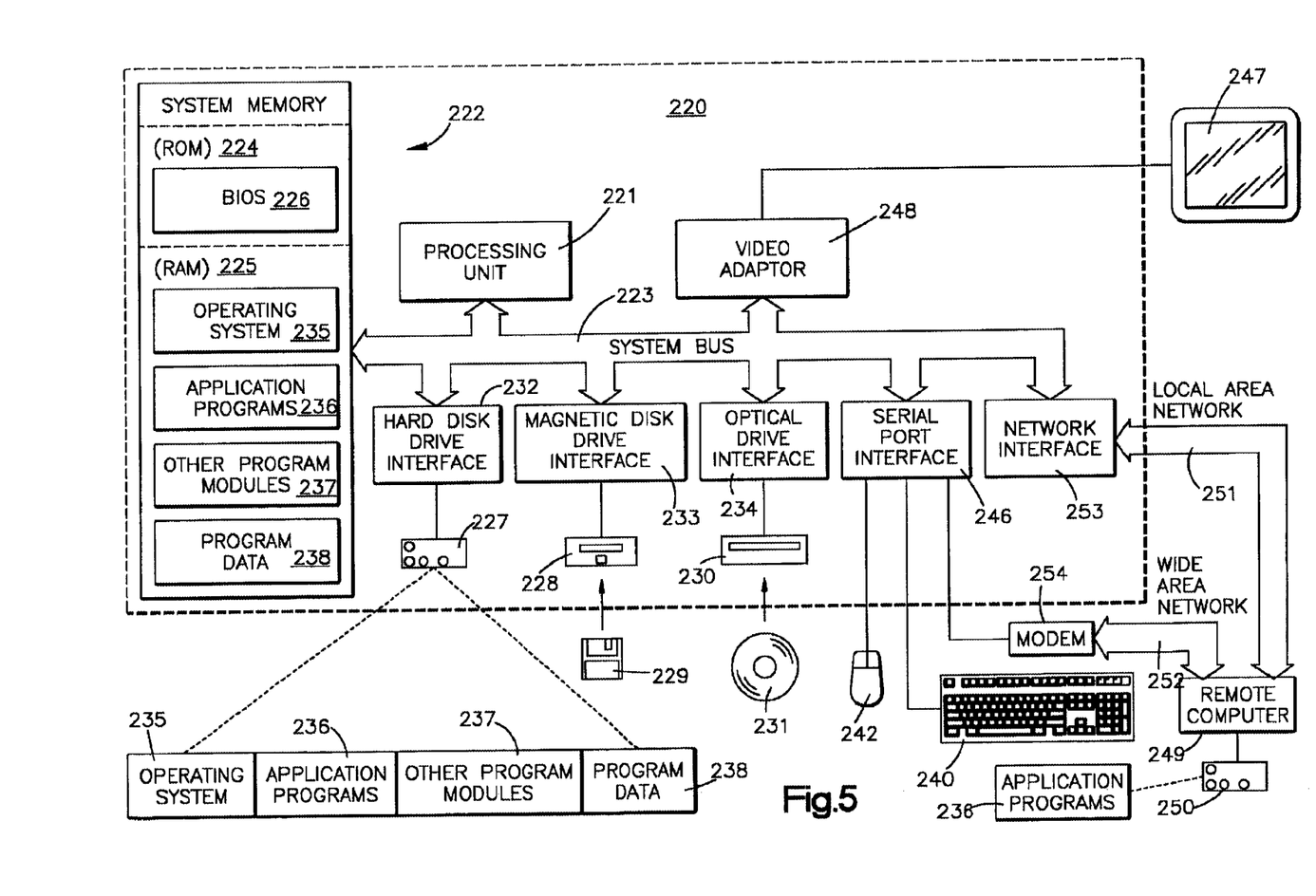
FIG. 5 is a schematic depiction of a computer system used in implementing the present invention.

With reference to FIG. 5, an exemplary data processing system for practicing the disclosed data mining engine invention includes a general purpose computing device in the form of a conventional computer 220, including one or more processing units 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures.

The system memory includes read only memory (ROM) 224 and random access memory (RAM) 225. A basic input/output system 226 (BIOS), containing the basic routines that helps to transfer information between elements within the computer 220, such as during start-up, is stored in ROM 224.

The computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231 such as a CD ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of computer readable instructions, data structures, program modules and other data for the computer 220. Although the exemplary environment described herein employs a hard disk, a removable magnetic disk 229 and a removable optical disk 231, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 229, optical disk 231, ROM 224 or RAM 225, including an operating system 235, one or more application programs 236, other program modules 237, and program data 238. A user may enter commands and information into the computer 220 through input devices such as a keyboard 240 and pointing device 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 48. In addition to the monitor, personal computers typically include other peripheral output devices (not shown), such as speakers and printers.

The computer 220 may operate in a networked environment using logical connections to one or more remote computers, such as a remote computer 249. The remote computer 249 may be another personal computer, a server, a router, a network PC, a peer device or other common network node, and typically includes many or all of the elements described above relative to the computer 220, although only a memory storage device 250 has been illustrated in FIG. 5. The logical connections depicted in FIG. 5 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the computer 220 typically includes a modem 254 or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

While the preferred embodiment of the present invention has been described with a degree of particularity it is the intent that the invention include modifications from the disclosed design falling within the spirit or scope of the appended claims.

What is claimed is:

1. In a computer data mining system, a method of analyzing a data set in a database and generating a reduced dimension data set Dnew of dimension m×k, m rows and k columns, from an original data set D of dimension m×n, m rows and n columns, wherein n>k by selecting a subset of k columns from a set of n columns in the original data set D where the m rows correspond to observations Ri where i=1, ..., m and the n columns correspond to attributes Aj where j=1, ..., n and dij is the data value associated with observation Ri and attribute Aj wherein the data values in the reduced data set Dnew for each of the selected k attributes is identical to the data values of the corresponding attributes in the original data set, the steps of the method comprising:

a) for each of the attributes Aj in the original data set D, calculating a variance value of data values dij, i=1, ..., m, associated with the attribute Aj;

b) selecting the k attributes having the greatest variance values; and c) generating the reduced data set Dnew by selecting data values from the original data set D corresponding to the selected k attributes.

2. The method of generating a reduced dimension data set of claim 1 wherein the variance value, Var(Aj), of each attribute Aj is calculated as follows:

$$\text{Var}(Aj) = [1/m] * \sum_{i=1}^{m} (dij - \text{Mean}(Aj))^2,$$

where the Mean(Aj) is calculated as follows:

$$\text{Mean}(Aj) = [1/m] * \sum_{i=1}^{m} dij.$$

3. The method of generating a reduced dimension data set of claim 1 wherein the variance value, Var(Aj), of each attribute Aj is calculated as follows:

$$Var(A_j)=1/(m-1)*\{\text{SumSquaredVector}(A_j)-[(1/m)*\text{SumVector}(A_j)*\text{SumVector}(A_j)]\}$$

where SumSquaredVector(Aj) and SumVector(Aj) are calculated as follows:

$$\text{SumSquareVector}(Aj) = \sum_{i=1}^{m} [(dij)^2]$$

$$\text{SumVector}(Aj) = \sum_{i=1}^{m} dij.$$

4. The method of generating a reduced dimension data set of claim 1 wherein a threshold variance value is determined corresponding to the kth greatest attribute variance value and each of the attribute variance values is compared to the threshold variance value to determine whether the attribute is to be included in a set of k selected columns.

5. The method of generating a reduced dimension data set of claim 1 wherein each of the attributes A(j) of the data set D comprises a discrete variable.

6. The method of generating a reduced dimension data set of claim 5 wherein each of the attributes A(j) of the original data set D comprises a dichotomous discrete variable.

7. The method of generating a reduced dimension data set of claim 1 wherein at least 90% of the data values of the original data set D have a value of zero.

8. In a computer data mining system, apparatus for use in analysis of a data set in a database for generating a reduced dimension data set Dnew having m rows and k columns from an original data set D having m rows and n columns, where n>k, the computer data mining system comprising:

a) one or more data storage devices for storing a database of records on a storage medium;

b) a computer having an interface to the storage devices for reading data from the storage medium and bring the data into rapid access memory for subsequent evaluation; and c) the computer comprising a processing unit for evaluating at least some of the data in the database and generating the reduced dimension data set Dnew by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set D by: calculating, for each of the columns Aj in the original data set D, a variance value of data values dij, i=1, ..., m, associated with the column Aj; selecting the k columns having the greatest variance values; and generating the reduced data set Dnew by selecting data values from the original data set D corresponding to the selected k columns.

9. The apparatus of claim 8 wherein the variance value, Var(Aj), of each column Aj is calculated as follows:

$$Var(Aj) = [1/m] * \sum_{i=1}^{m} (dij - Mean(Aj))^2,$$

where the Mean(Aj) is calculated as follows:

$$Mean(Aj) = [1/m] * \sum_{i=1}^{m} dij.$$

10. The apparatus of claim 8 wherein the variance value, Var(Aj), of each column Aj is calculated as follows:

$Var(A_j)=1/(m-1)*\{SumSquaredVector(A_j)-[(1/m)*SumVector(A_j)*SumVector(A_j)]\}$ where SumSquaredVector(Aj) and SumVector(Aj) are calculated as follows:

$$SumSquareVector(Aj) = \sum_{i=1}^{m} [(dij)^2]$$

$$SumVector(Aj) = \sum_{i=1}^{m} dij.$$

11. The apparatus of claim 8 wherein a threshold variance value is determined corresponding to the kth greatest column variance value and each of the column variance values is compared to the threshold variance value to determine whether the column is to be included in a set of k selected columns.

12. The apparatus of claim 8 wherein each of the columns A(j) of the data set D comprises a discrete variable.

13. The apparatus of claim 12 wherein each of the columns A(j) of the original data set D comprises a dichotomous discrete variable.

14. The apparatus of claim 8 wherein at least 90% of the data values of the original data set D have a value of zero.

15. In a computer data mining system, a computer-readable medium having computer-executable instructions for performing steps for analysis of a data set in a database and generating a reduced dimension data set Dnew having m rows and k columns from an original data set D having m rows and n columns, where n>k, the computer-readable medium comprising:
    a) one or more data storage devices for storing a database of records on a storage medium;
    b) a computer having an interface to the storage devices for reading data from the storage medium and bring the data into rapid access memory for subsequent evaluation; and
    c) the computer comprising a processing unit for evaluating at least some of the data in the database and generating the reduced dimension data set Dnew by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set D by: calculating, for each of the columns Aj in the original data set D, a variance value of data values dij, i=1, . . . , m, associated with the column Aj; selecting the k columns having the greatest variance values; and generating the reduced data set Dnew by selecting data values from the original data set D corresponding to the selected k columns.

16. The computer-readable medium of claim 15 wherein the variance value, Var(Aj), of each column Aj is calculated as follows:

$$Var(Aj) = [1/m] * \sum_{i=1}^{m} (dij - Mean(Aj))^2,$$

where the Mean(Aj) is calculated as follows:

$$Mean(Aj) = [1/m] * \sum_{i=1}^{m} dij.$$

17. The computer-readable medium of claim 15 wherein the variance value, Var(Aj), of each column Aj is calculated as follows:

$Var(A_j)=1/(m-1)*\{SumSquaredVector(A_j)-[(1/m)*SumVector(A_j)*SumVector(A_j)]\}$ where SumSquaredVector(Aj) and SumVector(Aj) are calculated as follows:

$$SumSquareVector(Aj) = \sum_{i=1}^{m} [(dij)^2]$$

$$SumVector(Aj) = \sum_{i=1}^{m} dij.$$

18. The computer-readable medium of claim 15 wherein a threshold variance value is determined corresponding to the kth greatest column variance value and each of the column variance values is compared to the threshold variance value to determine whether the column is to be included in a set of k selected columns.

19. The computer-readable medium of claim 15 wherein each of the columns A(j) of the data set D comprises a discrete variable.

20. The computer-readable medium of claim 19 wherein each of the columns A(j) of the original data set D comprises a dichotomous discrete variable.

21. The computer-readable medium of claim 19 wherein at least 90% of the data values of the original data set D have a value of zero.

22. In a computer data mining system, a method of analyzing a data set in a database and generating a reduced dimension data set Dnew having dimension m×k, m rows and n columns, from an original data set D having dimension m×n, m rows and n columns, wherein n>k by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set, the steps of the method comprising:
    a) for each of the columns Aj in the original data set D, calculating a variance value of data values dij, i=1, . . . , m, associated with the attribute Aj;
    b) selecting the k columns having the greatest variance values; and
    c) generating the reduced data set Dnew by selecting data values from the original data set D corresponding to the selected k columns.

23. The method of generating a reduced dimension data set of claim 22 wherein the variance value, Var(Aj), of each column Aj is calculated as follows:

$$\mathrm{Var}(Aj) = [1/m] * \sum_{i=1}^{m} (dij - \mathrm{Mean}(Aj))^2,$$

where the Mean(Aj) is calculated as follows:

$$\mathrm{Mean}(Aj) = [1/m] * \sum_{i=1}^{m} dij.$$

24. The method of generating a reduced dimension data set of claim 22 wherein the variance value, Var(Aj), of each column Aj is calculated as follows:

$$Var(A_j) = 1/(m-1)*\{\mathrm{SumSquaredVector}(A_j) - [(1/m)*\mathrm{SumVector}(A_j)*\mathrm{SumVector}(A_j)]\}$$

where SumSquaredVector(Aj) and SumVector(Aj) are calculated as follows:

$$\mathrm{SumSquareVector}(Aj) = \sum_{i=1}^{m} [(dij)^2]$$

$$\mathrm{SumVector}(Aj) = \sum_{i=1}^{m} dij.$$

25. The method of generating a reduced dimension data set of claim 22 wherein a threshold variance value is determined corresponding to the kth greatest column variance value and each of the column variance values is compared to the threshold variance value to determine whether the column is to be included in a set of k selected columns.

26. The method of generating a reduced dimension data set of claim 22 wherein each of the columns A(j) of the data set D comprises a discrete variable.

27. The method of generating a reduced dimension data set of claim 26 wherein each of the columns A(j) of the original data set D comprises a dichotomous discrete variable.

28. The method of generating a reduced dimension data set of claim 22 wherein at least 90% of the data values of the original data set D have a value of zero.

29. In a computer data mining system, a method of analyzing a data set in a database and generating a reduced dimension data set Dnew of dimension m×k, m rows and k columns, from an original data set D of dimension m×n, m rows and n columns, wherein n>k by selecting a subset of k columns from a set of n columns in the original data set D where the m rows correspond to observations Ri where i=1, ..., m and the n columns correspond to attributes Aj where j=1, ..., n and dij is the data value associated with observation Ri and attribute Aj wherein the data values in the reduced data set Dnew for each of the selected k attributes is identical to the data values of the corresponding attributes in the original data set, the steps of the method comprising:

a) for each of the attributes Aj in the original data set D, calculating a variance value of data values dij, i=1, ..., m, associated with the attribute Aj, wherein the variance value, Var(Aj), of each attribute Aj is calculated as follows:

$$\mathrm{Var}(Aj) = [1/m] * \sum_{i=1}^{m} (dij - \mathrm{Mean}(Aj))^2,$$

where the Mean(Aj) is calculated as follows:

$$\mathrm{Mean}(Aj) = [1/m] * \sum_{i=1}^{m} dij;$$

b) selecting the k attributes having the greatest variance values; and c) generating the reduced data set Dnew by selecting data values from the original data set D corresponding to the selected k attributes.

30. In a computer data mining system, a method of analyzing a data set in a database and generating a reduced dimension data set Dnew of dimension m×k, m rows and k columns, from an original data set D of dimension m×n, m rows and n columns, wherein n>k by selecting a subset of k columns from a set of n columns in the original data set D where the m rows correspond to observations Ri where i=1, ..., m and the n columns correspond to attributes Aj where j=1, ..., n and dij is the data value associated with observation Ri and attribute Aj wherein the data values in the reduced data set Dnew for each of the selected k attributes is identical to the data values of the corresponding attributes in the original data set, the steps of the method comprising:

a) for each of the attributes Aj in the original data set D, calculating a variance value of data values dij, i=1, ..., m, associated with the attribute Aj, wherein the variance value, Var(Aj), of each attribute Aj is calculated as follows:

$$Var(A_j) = 1/(m-1)*\{\mathrm{SumSquaredVector}(A_j) - [(1/m)*\mathrm{SumVector}(A_j)*\mathrm{SumVector}(A_j)]\}$$

where SumSquaredVector(Aj) and SumVector(Aj) are calculated as follows:

$$\mathrm{SumSquareVector}(Aj) = \sum_{i=1}^{m} [(dij)^2]$$

$$\mathrm{SumVector}(Aj) = \sum_{i=1}^{m} dij; \text{ and}$$

b) selecting the k attributes having the greatest variance values; and c) generating the reduced data set Dnew by selecting data values from the original data set D corresponding to the selected k attributes.

31. The method of generating a reduced dimension data set of claim 29 wherein a threshold variance value is determined corresponding to the kth greatest attribute variance value and each of the attribute variance values is compared to the threshold variance value to determine whether the attribute is to be included in a set of k selected columns.

32. The method of generating a reduced dimension data set of claim 30 wherein a threshold variance value is determined corresponding to the kth greatest attribute variance value and each of the attribute variance values is compared to the threshold variance value to determine whether the attribute is to be included in a set of k selected columns.

33. In a computer data mining system, apparatus for use in analysis of a data set in a database for generating a reduced dimension data set Dnew having m rows and k columns from an original data set D having m rows and n columns, where n>k, the computer data mining system comprising:
   a) one or more data storage devices for storing a database of records on a storage medium;
   b) a computer having an interface to the storage devices for reading data from the storage medium and bring the data into rapid access memory for subsequent evaluation; and
   c) the computer comprising a processing unit for evaluating at least some of the data in the database and generating the reduced dimension data set Dnew by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set D by: calculating, for each of the columns Aj in the original data set D, a variance value of data values dij, i=1, ..., m, associated with the column Aj, wherein the variance value, Var(Aj), of each column Aj is calculated as follows:

$$\text{Var}(Aj) = [1/m] * \sum_{i=1}^{m} (dij - \text{Mean}(Aj))^2,$$

where the Mean(Aj) is calculated as follows:

$$\text{Mean}(Aj) = [1/m] * \sum_{i=1}^{m} dij;$$

selecting the k columns having the greatest variance values; and generating the reduced data set Dnew by selecting data values from the original data set D corresponding to the selected k columns.

34. In a computer data mining system, apparatus for use in analysis of a data set in a database for generating a reduced dimension data set Dnew having m rows and k columns from an original data set D having m rows and n columns, where n>k, the computer data mining system comprising:
   a) one or more data storage devices for storing a database of records on a storage medium;
   b) a computer having an interface to the storage devices for reading data from the storage medium and bring the data into rapid access memory for subsequent evaluation; and
   c) the computer comprising a processing unit for evaluating at least some of the data in the database and generating the reduced dimension data set Dnew by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set D by: calculating, for each of the columns Aj in the original data set D, a variance value of data values dij, i=1, ..., m, associated with the column Aj, wherein the variance value, Var(Aj), of each column Aj is calculated as follows:

$$\text{Var}(A_j) = 1/(m-1) * \{\text{SumSquaredVector}(A_j) - [(1/m) * \text{SumVector}(A_j) * \text{SumVector}(A_j)]\}$$

where SumSquaredVector(Aj) and SumVector(Aj) are calculated as follows:

$$\text{SumSquareVector}(Aj) = \sum_{i=1}^{m} [(dij)^2]$$

$$\text{SumVector}(Aj) = \sum_{i=1}^{m} dij;$$

selecting the k columns having the greatest variance values; and generating the reduced data set Dnew by selecting data values from the original data set D corresponding to the selected k columns.

35. The apparatus of claim 33 wherein a threshold variance value is determined corresponding to the kth greatest column variance value and each of the column variance values is compared to the threshold variance value to determine whether the column is to be included in a set of k selected columns.

36. The apparatus of claim 34 wherein a threshold variance value is determined corresponding to the kth greatest column variance value and each of the column variance values is compared to the threshold variance value to determine whether the column is to be included in a set of k selected columns.

37. In a computer data mining system, a computer-readable medium having computer-executable instructions for performing steps for analysis of a data set in a database and generating a reduced dimension data set Dnew having m rows and k columns from an original data set D having m rows and n columns, where n>k, the computer-readable medium comprising:
   a) one or more data storage devices for storing a database of records on a storage medium;
   b) a computer having an interface to the storage devices for reading data from the storage medium and bring the data into rapid access memory for subsequent evaluation; and
   c) the computer comprising a processing unit for evaluating at least some of the data in the database and generating the reduced dimension data set Dnew by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set D by: calculating, for each of the columns Aj in the original data set D, a variance value of data values dij, i=1, ..., m, associated with the column Aj, wherein the variance value, Var(Aj), of each column Aj is calculated as follows:

$$\text{Var}(Aj) = [1/m] * \sum_{i=1}^{m} (dij - \text{Mean}(Aj))^2,$$

where the Mean(Aj) is calculated as follows:

$$\text{Mean}(Aj) = [1/m] * \sum_{i=1}^{m} dij;$$

selecting the k columns having the greatest variance values; and generating the reduced data set Dnew by selecting data values from the original data set D corresponding to the selected k columns.

38. In a computer data mining system, a computer-readable medium having computer-executable instructions for performing steps for analysis of a data set in a database and generating a reduced dimension data set Dnew having m rows and k columns from an original data set D having m rows and n columns, where n>k, the computer-readable medium comprising:
   a) one or more data storage devices for storing a database of records on a storage medium;
   b) a computer having an interface to the storage devices for reading data from the storage medium and bring the data into rapid access memory for subsequent evaluation; and
   c) the computer comprising a processing unit for evaluating at least some of the data in the database and generating the reduced dimension data set Dnew by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set D by: calculating, for each of the columns Aj in the original data set D, a variance value of data values dij, i=1, ..., m, associated with the column Aj, wherein the variance value, Var(Aj), of each column Aj is calculated as follows:

$$Var(A_j) = 1/(m-1) * \{\text{SumSquaredVector}(A_j) - [(1/m) * \text{SumVector}(A_j) * \text{SumVector}(A_j)]\}$$

where SumSquaredVector(Aj) and SumVector(Aj) are calculated as follows:

$$SumSquareVector(Aj) = \sum_{i=1}^{m} [(dij)^2]$$

$$SumVector(Aj) = \sum_{i=1}^{m} dij;$$

selecting the k columns having the greatest variance values; and generating the reduced data set Dnew by selecting data values from the original data set D corresponding to the selected k columns.

39. The computer-readable medium of claim 37 wherein a threshold variance value is determined corresponding to the kth greatest column variance value and each of the column variance values is compared to the threshold variance value to determine whether the column is to be included in a set of k selected columns.

40. The computer-readable medium of claim 38 wherein a threshold variance value is determined corresponding to the kth greatest column variance value and each of the column variance values is compared to the threshold variance value to determine whether the column is to be included in a set of k selected columns.

41. In a computer data mining system, a method of analyzing a data set in a database and generating a reduced dimension data set Dnew having dimension m×k, m rows and n columns, from an original data set D having dimension m×n, m rows and n columns, wherein n>k by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set, the steps of the method comprising:
   a) for each of the columns Aj in the original data set D, calculating a variance value of data values dij, i=1, ..., m, associated with the attribute Aj, wherein the variance value, Var(Aj), of each column Aj is calculated as follows:

$$Var(Aj) = [1/m] * \sum_{i=1}^{m} (dij - \text{Mean}(Aj))^2,$$

where the Mean(Aj) is calculated as follows:

$$\text{Mean}(Aj) = [1/m] * \sum_{i=1}^{m} dij;$$

b) selecting the k columns having the greatest variance values; and
   c) generating the reduced data set Dnew by selecting data values from the original data set D corresponding to the selected k columns.

42. In a computer data mining system, a method of analyzing a data set in a database and generating a reduced dimension data set Dnew having dimension m×k, m rows and n columns, from an original data set D having dimension m×n, m rows and k columns, wherein n>k by selecting a subset of k columns from a set of n columns in the original data set D where dij is the data value associated with row Ri and column Aj and wherein the data values in the reduced data set Dnew for each of the selected k columns is identical to the data values of the corresponding columns in the original data set, the steps of the method comprising:
   a) for each of the columns Aj in the original data set D, calculating a variance value of data values dij, i=1, ..., m, associated with the attribute Aj, wherein the variance value, Var(Aj), of each column Aj is calculated as follows:

$$Var(A_j) = 1/(m-1) * \{\text{SumSquaredVector}(A_j) - [(1/m) * \text{SumVector}(A_j) * \text{SumVector}(A_j)]\}$$

where SumSquaredVector(Aj) and SumVector(Aj) are calculated as follows:

$$SumSquareVector(Aj) = \sum_{i=1}^{m} [(dij)^2]$$

$$SumVector(Aj) = \sum_{i=1}^{m} dij;$$

b) selecting the k columns having the greatest variance values; and
   c) generating the reduced data set Dnew by selecting data values from the original data set D corresponding to the selected k columns.

43. The method of generating a reduced dimension data set of claim 41 wherein a threshold variance value is determined corresponding to the kth greatest column variance value and each of the column variance values is compared to the threshold variance value to determine whether the column is to be included in a set of k selected columns.

44. The method of generating a reduced dimension data set of claim 42 wherein a threshold variance value is determined corresponding to the kth greatest column variance value and each of the column variance values is compared to the threshold variance value to determine whether the column is to be included in a set of k selected columns.

* * * * *